July 11, 1950 K. C. S. AASTED 2,515,150
METHOD OF TREATING CHOCOLATE RAW MATERIALS
Filed Sept. 12, 1947
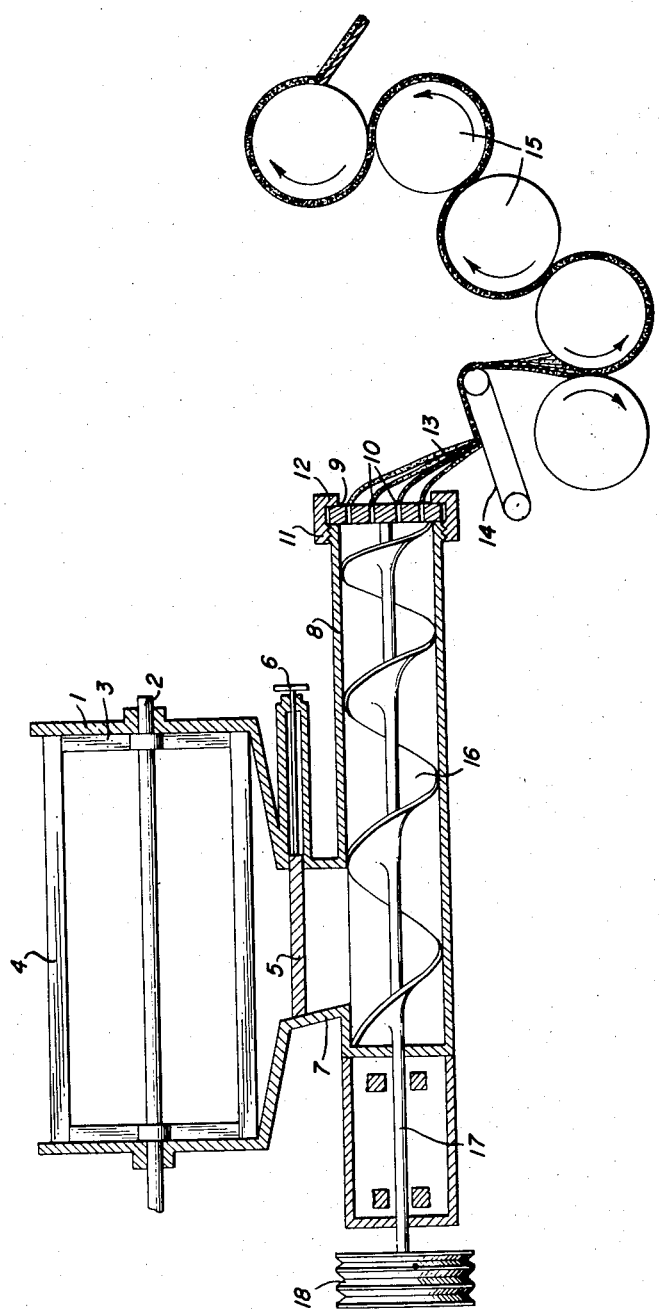
INVENTOR
KAI CHRISTIAN SOPHUS AASTED Patented July 11, 1950

2,515,150

UNITED STATES PATENT OFFICE 2,515,150

METHOD OF TREATING CHOCOLATE RAW MATERIALS

Kai Christian Sophus Aasted, Gentofte, Denmark

Application September 12, 1947, Serial No. 773,613
In Sweden March 21, 1946

Section 1, Public Law 690, August 8, 1946
Patent expires March 21, 1966

4 Claims. (Cl. 99—23)

1

It is known to produce raw chocolate mass or a similar substance from the raw materials by subjecting the latter for some time to a number of slight pressures by means of the rotating rollers in a so-called edge runner. The present invention relates to a method by which the chocolate raw materials or the substance in question is subjected to a single vigorous pressure for achieving the desired plastic consistency. In practice it has been found that this is a better and quicker way of achieving the sought change of condition.

The invention is based upon the observation that a mixture of cocoa mass and sugar, on being subjected to a vigorous pressure, will undergo such a change of condition that the mass will become plastic. This may be explained by the fact that the cocoa nibs are being crushed, whereby the cocoa butter within said nibs is being squeezed out. This also applies to rolled, powdered chocolate mass.

Accordingly the present invention has for its aim to subject the said substances to a single vigorous pressure of the order of magnitude of 200 kg./cm.² The said pressure may expediently be exerted continually in a machine, through which the substances in question pass, whereby, according to the invention, raw materials for the raw chocolate mass or a similar substance which is to be treated, is fed to a mixing machine from which the mixed material is fed to the machine in which it is subjected to the high pressure and from where it flows continually to a roller mill or some other further processing machine.

The said machine, in which the chocolate mass is subjected to the said high pressure may treat the chocolate mass portion by portion or continually. According to the invention the machine may for instance be constructed as a mixing machine such as a piston cylinder or a worm tube, below which a nozzle body is disposed with one or more narrow nozzles, holes, or slots, and in which the mass is subjected to the high pressure by means of a piston or a worm, respectively, and then pressed out by means of same from the vessel. The nozzle body may expediently be located in one of the end plates of the said vessel, and according to the invention the nozzle body may be attached to the said end plate by means of a collar nut, the collar of which fits around the outer edge of the nozzle body, which may thereby easily be removed for cleaning or renewal.

Further according to the invention the said vessel may be disposed immediately below the mixing device, from which the raw material,

2 after the mixing in the said device has been completed, can flow down into the pressure vessel through a funnel-shaped bottom, which may be closed by a slidable gate. Besides obtaining the high pressure in the mass by using a worm, the mass is at the same time subjected to a kneading process, which precipitates the conversion of the mass into the changed condition and makes the mass very homogeneous. Furthermore, by using such a worm a steadily increasing pressure may be exerted on the mass as it passes through the pressure vessel, i. e. the worm tube, and this effect may be advanced by letting the pitch of the thread of the worm decrease in the direction of the nozzle body, whereby the pressure is increased in consequence of the decreasing volume of the spaces between the turns of the worm.

If a piston cylinder is used, the advantage is obtained, on the other hand, that the said cylinder may be constructed as a high pressure cylinder. In the cylinder the chocolate mass will in that case be pressed out of the nozzle body by the piston of the cylinder, which piston is connected to the bigger hydraulic piston of a bigger cylinder placed co-axially with the former cylinder, the big piston being acted upon by oil from an oil pump.

The drawing shows a schematic representation of a sectional elevation of an embodiment of a machine according to the invention.

1 is a mixing vessel or other mixing device with a horizontal shaft 2 carrying a number of radially disposed vanes 3 with external scrapers 4. When the raw materials which are to be treated have been put into the vessel 1, which is heated to a suitable temperature, the vanes 3 will cause the raw materials to assume the character of a granulated mass with small grains of uniform size. However, the grain size will increase during the treatment in the mixing vessel, and when the grains have attained the size of a pea, a slidable gate 5 is drawn out, for instance by means of a handle 6, whereby the grains fall through a funnel 7 into a worm tube 8. At one end of the said tube a nozzle body 9 with a number of narrow nozzles 10 is disposed. The nozzle body 9 is attached to the tube 8 by means of a collar nut 11, the external collar 12 of which fits around the outer edge of the nozzle body 9.

The worm 16, situated in the tube 8, is mounted on a shaft 17, on the external end of which some rope pulleys 18 are fixed, through the medium of which the rotating motion is transmitted to the worm 16. As appears from the drawing, the pitch of the thread of the worm 16 decreases in the direction of the nozzle body 9, whereby the mass in the worm tube 8 will be moved towards the nozzle body under constantly rising pressure, and before the mass has reached the stage of passing through the holes in the nozzle body, it will have been exposed to such a high pressure of the order of magnitude of 200 kg./cm.$^2$ that the condition of the mass will be changed, the mass being converted from a granulated mass into a paste or unguent-like mass. The said mass 13 flows down from the nozzles 10 on to a belt conveyor 14, which conveys the mass for instance to a roller mill 15.

Instead of the worm 16 a reciprocating piston may be mounted in the tube 8. After the return stroke of the piston in the tube a certain quantity of granulated mass is introduced from the mixing vessel 1 by the opening of the gate 5, and then the piston is moved forwards, whereby the mass is pressed out through the nozzle body 9 under the required pressure.

Having now described my invention, what I claim as new and desire to secure by Letters Patent is:

1. A method for converting chocolate raw material comprising cocoa mass and sugar into a mass of plastic consistency, which comprises subjecting the said raw material to a single vigorous pressure of the order of magnitude of 200 kilograms per square centimeter.

2. A method according to claim 1 in which the material is discharged continually from the pressure treatment.

3. A method for converting chocolate raw material comprising cocoa mass and sugar into a mass of plastic consistency, which comprises subjecting the cocoa mass and sugar to a mixing operation, subjecting said mixed raw material to a single vigorous pressure of the order of magnitude of 200 kilograms per square centimeter, and thereafter subjecting the material to a rolling operation.

4. A method according to claim 3 in which the material is discharged continually from the pressure treatment.

KAI CHRISTIAN SOPHUS AASTED.

REFERENCES CITED

The following references are of record in the file of this patent:

UNITED STATES PATENTS

| Number | Name | Date |
|---|---|---|
| 998,113 | Neumann | July 18, 1911 |
| 2,147,184 | Aasted | Feb. 14, 1939 |
| 2,313,705 | Jack | Mar. 9, 1943 |

FOREIGN PATENTS

| Number | Country | Date |
|---|---|---|
| 14,758 | Great Britain | of 1913 |
| 20,436 | Great Britain | of 1891 |

OTHER REFERENCES

Jensen, "Manufacture of Chocolate Conf. and Cocoa," page 160, 1931.